(12) United States Patent
Liu

(10) Patent No.: US 6,940,888 B2
(45) Date of Patent: Sep. 6, 2005

(54) DUAL HEAD LASER SYSTEM WITH INTRA-CAVITY POLARIZATION, AND PARTICLE IMAGE VELOCIMETRY SYSTEM USING SAME

(75) Inventor: Kuo-Ching Liu, Fremont, CA (US)

(73) Assignee: New Wave Research, Fremont, CA (US)

( * ) Notice: Subject to any disclaimer, the term of this patent is extended or adjusted under 35 U.S.C. 154(b) by 98 days.

(21) Appl. No.: 10/301,186

(22) Filed: Nov. 21, 2002

(65) Prior Publication Data

US 2004/0100999 A1 May 27, 2004

(51) Int. Cl.$^7$ .............................................. H01S 3/082
(52) U.S. Cl. ............................ 372/97; 372/24; 356/28
(58) Field of Search ..................... 356/28, 318; 372/10, 372/21–22, 24, 66, 97

(56) References Cited

U.S. PATENT DOCUMENTS

| | | | |
|---|---|---|---|
| 4,326,175 A | | 4/1982 | Dehney et al. |
| 4,988,191 A | | 1/1991 | Adrian et al. .................. 356/28 |
| 5,191,588 A | * | 3/1993 | Dacquay ...................... 372/22 |
| 5,345,457 A | | 9/1994 | Zenzie et al. |
| 5,548,419 A | * | 8/1996 | Adrian et al. ................. 359/24 |
| 5,737,347 A | * | 4/1998 | Scheps et al. ................ 372/23 |
| 5,854,802 A | * | 12/1998 | Jin et al. ...................... 372/22 |
| 5,998,759 A | * | 12/1999 | Smart .................... 219/121.69 |
| 6,008,897 A | * | 12/1999 | Sabsabi et al. ............. 356/318 |
| 2003/0234928 A1 | * | 12/2003 | Lucas et al. ................ 356/318 |

OTHER PUBLICATIONS

Christian Willert et al. "Recent Applications of Particle Image Velocimetry in Aerodynamic Research" Flow Measurement and Instrumentation, vol. 7, No. 3–4, pp. 247–256.

Tobias Plessing et al. "An Experimental and Numerical Study of a Laminar Triple Flame", vol. 115, No.3 Nov. 1998 pp. 335–353.

H. Hu et al. "Dual–Plane Stereoscopic Particle Image Velocimetry: System Set–Up and Its Application on a Lobed Jet Mixing Flow" vol. 31, No. 3 Sep. 2001, pp. 277–293.

Cross, Pat, "NASA Laser Tutorial Glossary," can be found at http://aesd.larc.nasa.gov/GL/tutorial/glossary/gloss.htm, Last modified May 15, 2004, 11 pages.

Wadsworth, William, "Easy Laser Physics," can be found at http://www–alphys.physics.ox.ac.uk/research/groups/laser/lasers.html, 1994, 6 pages.

"Applications of Particle Image Velocimetry to Fluid Flow Measurements", available at http://www.tsi.com/fluid/products/piv/applications/applications.htm, no date.

"What is PIV?", undated presentation (2002), Delft University of Technology, The Netherlands.

* cited by examiner

*Primary Examiner*—Minsun Oh Harvey
*Assistant Examiner*—James Menfee
(74) *Attorney, Agent, or Firm*—Haynes Beffel & Wolfeld LLP

(57) ABSTRACT

A laser system includes a resonator having two gain modules generating pulses, coupled with intra-cavity polarization into a single beam line, using a single output coupler. A laser controller controls the laser heads to emit pulses in rapid succession, such as pulse pairs separated by a time interval of less than about 1 millisecond, and in some embodiments in a range from about zero (overlapping) to about 100 microseconds. Also a system adapted for metrology using particle image velocimetry PIV uses the resonator. For PIV, optics are provided in the output beam paths which expand the beam to form pulsed illumination sheets. A camera is used to capture images of the pulsed illumination sheets for analysis.

29 Claims, 5 Drawing Sheets

DUAL HEAD LASER SYSTEM WITH INTRA-CAVITY POLARIZATION, AND PARTICLE IMAGE VELOCIMETRY SYSTEM USING SAME

BACKGROUND OF THE INVENTION

1. Field of the Invention

The present invention relates to systems and techniques for producing laser pulses in rapid succession, and to such laser systems used in the field of Particle Image Velocimetry (PIV).

2. Description of Related Art

In PIV, laser pulses are directed in rapid succession into a fluid flow, which in some cases includes tracer particles. A camera is used to capture images of the fluid flow during the pulses. The images captured can be analysed to determine characteristics of the flow. Often, a single exposure by the camera is used to capture the image during two pulses. For some embodiments, the laser pulses must be generated in rapid succession. Also, the laser pulses should be substantially equal in power and duration to simplify the analysis of the captured image or images. Finally, it is important for the laser pulses to illuminate the same space in the field of the camera during the successive pulses, because changes in position of the illumination complicate analysis of movement of the particles in the flow.

FIG. 1 illustrates a prior art PIV system, including first laser 101 and second laser 102 which are used to produce pulses (schematically pulses 101A, 102A) of laser light in rapid succession. Pulses from the first laser 101 and second laser 102 are merged to a single beam line and used as a pair (schematically pulse pair 124) to form an illumination sheet 125 in a fluid flow 140. Camera 133 acquires an image 132 of particles in the illumination sheet 125. In this example, a polarized output pulse 103 from first laser 101 is directed to mirror 110, which reflects it towards dichroic polarization splitter 111. Output beam 104 from second laser 102 has polarization rotated by ninety degrees from the polarization of the output pulse 103, and is likewise directed to the dichroic polarization splitter 111, where its path is co-located in laser beam path 105 with the path of output pulse 103 from first laser 101. In some embodiments, the lasers 101 and 102 comprise diode pumped, Nd:YAG solid state lasers producing output pulses in a primary wavelength of 1064 nanometers. In these embodiments, a harmonic generator (not shown) may be placed in path 105, to convert the 1064 nanometer pulse to a visible wavelength, such as 532 nanometers. Path 105 directs the pulses through spherical lens 115 to prism 120. Prism 120 directs pulses on laser beam path 105 to cylindrical lens 121, which forms the pulses into pulsed illumination sheet 125 in the fluid flow 140.

Illumination sheet 125 illuminates particles 131 within fluid flow 140, and the particles thus illuminated form an image 132 within camera 133. Particle images thus acquired, are processed by computer where a PIV analysis can be performed.

Commonly, pulses from two separate lasers are required in Particle Image Velocimetry applications, because the time between pulses is shorter, and the energy of the pulses is higher, than can be practically generated using a single gain medium. A controller, typically implemented using a computer, sets a controllable time delay between the separate lasers, and sets the power of the output pulses. The optical components used to create the illumination sheet must be carefully aligned, so that the pulses from the two lasers illuminate substantially the same space in the flow. Any misalignment of the illuminated spaces is directly reflected in the captured image, and complicates the analysis of the image. Also, the energy of the pulses should be substantially the same or precisely controlled, so that the captured images of the two pulses can be more readily processed.

As shown in FIG. 2, one prior art system employs two IR laser resonators. A first laser 101 has a resonant cavity including first mirror 231, a first laser gain module 230, a first Q-switch 233, a first output coupling mirror 234. A second laser 102 has a resonant cavity including a second mirror 251, a second laser gain module 250, a second Q-switch 253, a second output coupling mirror 254. A laser controller 240 is coupled to the laser gain modules and Q-switches of the first and second lasers, and can adjust parameters of the system, including the time delay between the pulses from the first and second independent lasers.

In the embodiment of FIG. 2, the first laser output beam 260 is reflected by mirror 255 to polarizer 256, where it is combined with the second laser output beam 261 which has passed through half-wave plate 259. The beam paths are merged at polarizer 256 into a co-located beam path 262. The beam path 262 is directed to harmonic generator 258, which converts the pulses on beam path 262 to output pulses on beam path 264 having a visible wavelength.

The output beam 264 thus formed can be utilized to form an illumination sheet for use in PIV measurements in a manner similar to that shown in FIG. 1.

The technique of externally combining pulses generated by two independent IR lasers has several shortcomings. For example, this arrangement is highly sensitive to the correct mechanical alignment of the lasers and the optics in the beam paths.

SUMMARY OF THE INVENTION

The present invention solves these problems by introducing a single laser with two laser heads having pulsed outputs co-located in a single output beam path. In embodiments of the invention, the pulses are coupled with intra-cavity polarization into a single beam line, and emitted from a shared output coupler. A laser controller controls the laser heads to emit pulses in rapid succession, such as pulse pairs separated by a time interval of less than about 1 millisecond, and in some embodiments in a range from about zero (overlapping) to about 100 microseconds. The invention is embodied by a laser system comprising a laser resonator that includes a first laser gain module, second laser gain module and a shared output coupler, which induce pulses co-located in an output beam path. The controller is coupled to the first and second laser gain modules, and induces a first pulse by the first laser gain module and a second pulse by the second laser gain module, wherein the first and second pulses are spaced in time by a controllable time interval.

The invention is also embodied by a system adapted for metrology using particle image velocimetry PIV. In such embodiments, a beam expander, such as a cylindrical lens, is provided in the output beam path which expand the pulses in one dimension to form pulsed illumination sheets. A camera is used to capture images of the pulsed illumination sheets for analysis.

The first and second laser gain modules have substantially equal specifications, so that the pulses generated match as well as practical.

Embodiments of the invention include an intra-cavity polarizer positioned to merge pulses emitted from the first and second laser gain modules into a single beam path. A polarization rotator is coupled with one of the first and second laser gain modules, and rotates polarization by about 90 degrees. This way, polarization can be used a couple the pulses from the separate laser gain modules into a single beam line for output by the shared output coupler.

According to other aspects of the invention, embodiments of the invention generate visible pulses. In some embodiments, the laser gain modules generate pulses in a primary wavelength, such as an infrared wavelength, and the resonator includes a harmonic generator to convert a primary wavelength to a harmonic wavelength for output in the visible range.

For some embodiments using polarization coupling, as described above, the laser gain modules comprise solid-state gain media that do not substantially affect the polarization of the beams in the resonator, such as Nd:YLF. Also for some embodiments using intra-cavity polarization coupling, the harmonic generator comprises a type II second harmonic generator, further comprises the material such as LBO that does not substantially affect polarization of the beams in the harmonic generator.

In yet other embodiments, the resonator has a resonant path including an output leg, a first gain leg and a second gain leg, optical components, including an output coupler and a polarizer, define the output leg, optical components, including a first Q-switch, a first laser gain module and a first high reflector, define the first gain leg from the polarizer through the first laser gain module to the first high reflector, and optical components, including a second Q-switch, a second laser gain module, a polarization rotator and a second high reflector, define a second gain leg from the polarizer through the second laser gain module to the second high reflector, beams in the first and second gain legs merge at the polarizer into the output leg.

In yet another embodiment, the laser resonator has a resonant path comprising optical components, including an output coupler, a type II harmonic generator and a polarizer, defining the output leg, optical components, including a first electro-optical Q-switch, a first Nd:YLF laser gain module and a first high reflector, defining the first gain leg from the polarizer through the first laser gain module to the first high reflector, and optical components, including a second electro-optical Q-switch, a second Nd:YLF laser gain module, a polarization rotator and a second high reflector, defining a second gain leg from the polarizer through the second laser gain module to the second high reflector, beams in the first and second gain legs merge at the polarizer into the output leg.

In some embodiments, the output leg includes a harmonic generator, and the output coupler in the output leg comprises a component highly reflective for a primary wavelength generated by the first and second laser gain modules, and least partially transmissive for a harmonic wavelength generated in the harmonic generator. In one embodiment including a harmonic generator, the output leg includes a high reflector for the harmonic wavelength generated in the harmonic generator, and the output coupler is arranged to reflect light in the primary wavelength along a beam line through the harmonic generator to the high reflector, and to transmit light in the harmonic wavelength from the harmonic generator on the output beam path.

The present invention provides a single laser design with two separately controllable Q-switches and laser active gain modules. No external laser path jointing is required according to the present invention to merge pulses into a single beam line. The two active gain modules are coupled together within a single laser resonator with an intra-cavity polarizer, and share common output coupler and/or harmonic crystal. Since both modules share the same output coupler and part of the optical components in the resonant cavity, their output parameters are much closer than can be generated using two independent lasers, and the pulses are co-located and aligned automatically. Therefore, the proposed design provides a more robust, lower cost and easy to use PIV laser system having improved optical characteristics.

Other aspects and advantages of the present invention can be seen on review of the drawings, the detailed description and the claims, which follow.

DETAILED DESCRIPTION

Figure 1:
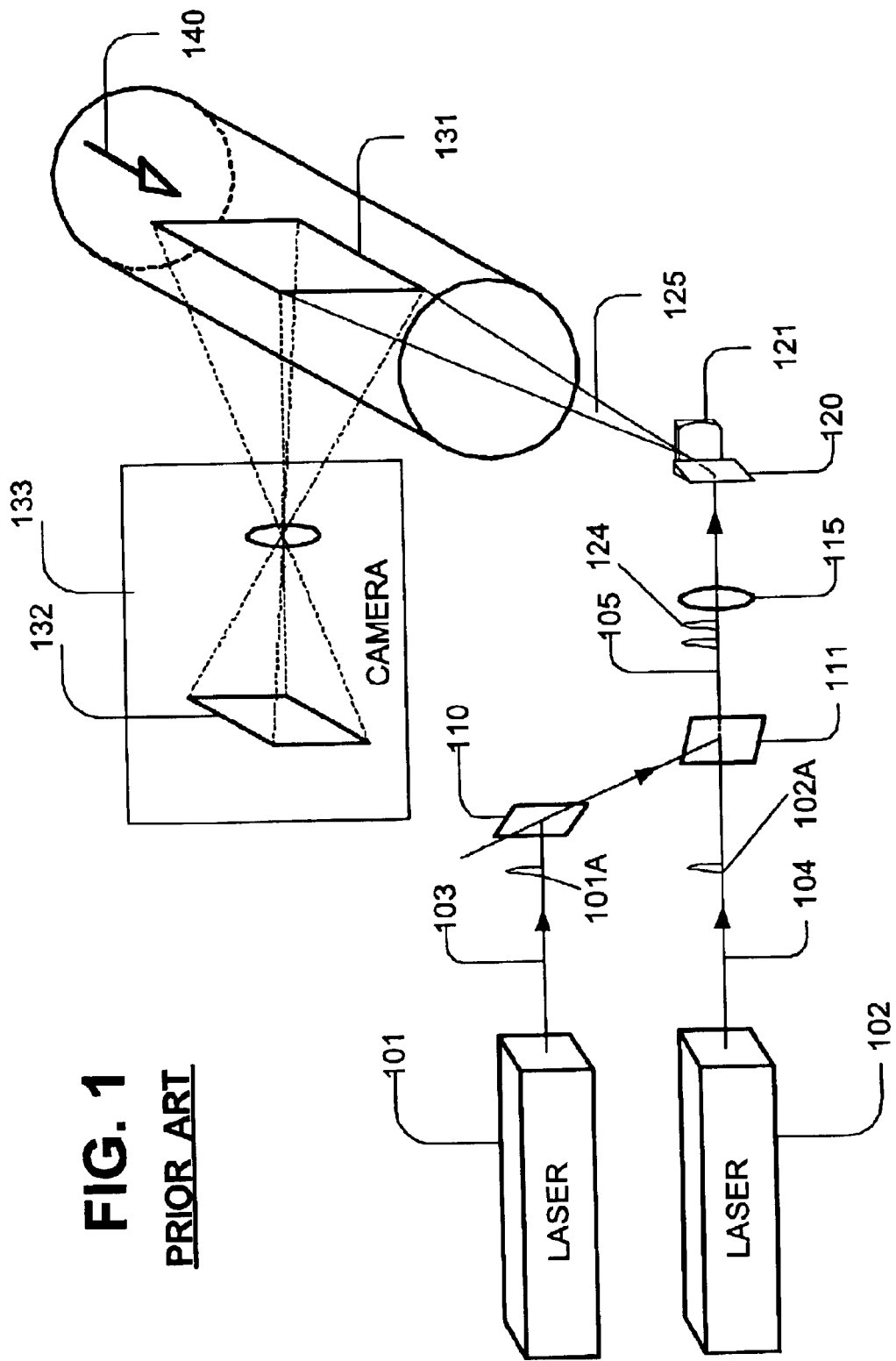
FIG. 1 shows a prior art optical configuration of a conventional system for PIV employing two independent lasers.
Figure 2:
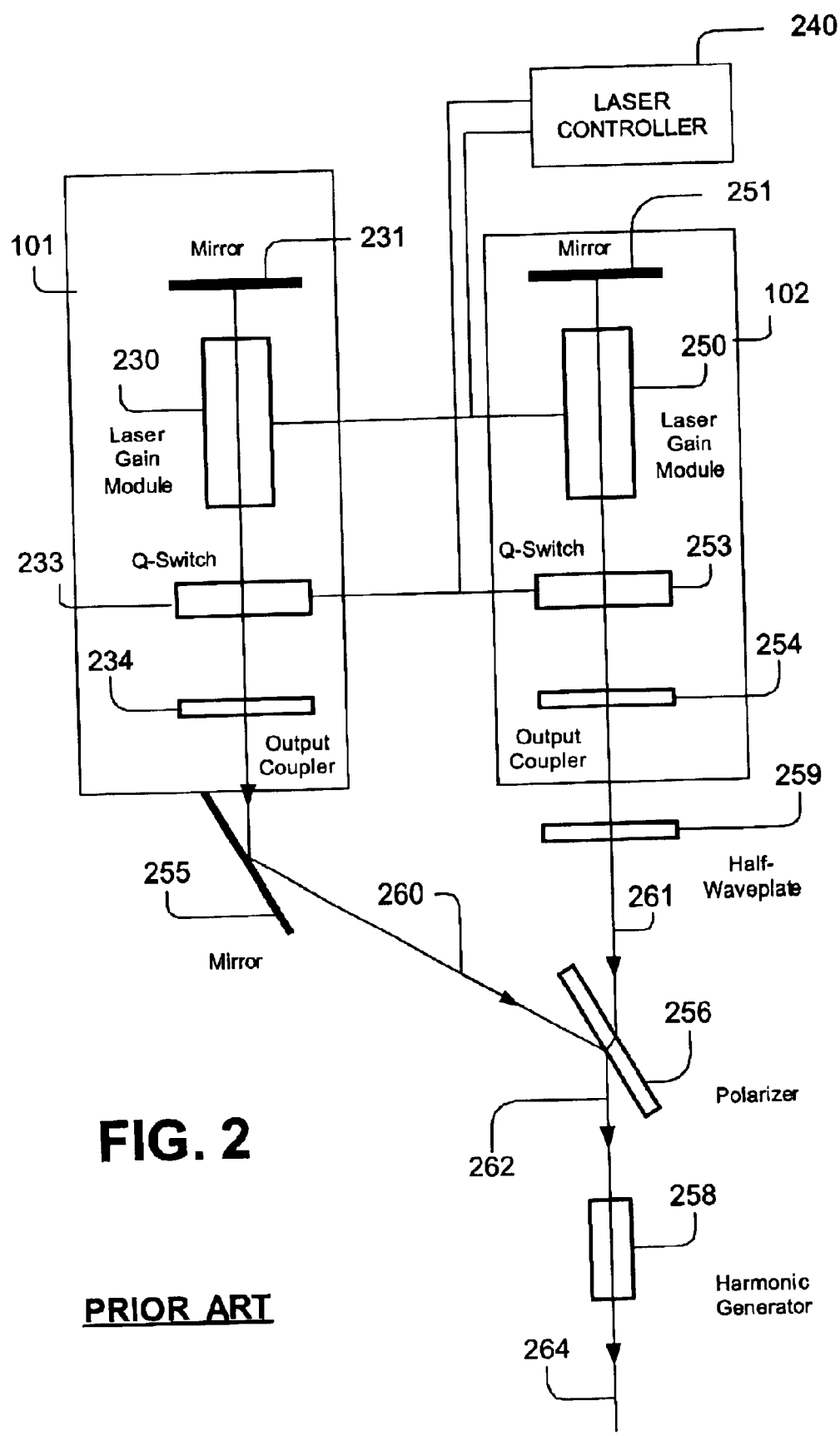
FIG. 2 shows a prior art laser configuration for PIV, implemented with two independent IR lasers whose beams are combined using external optics.
Figure 3:
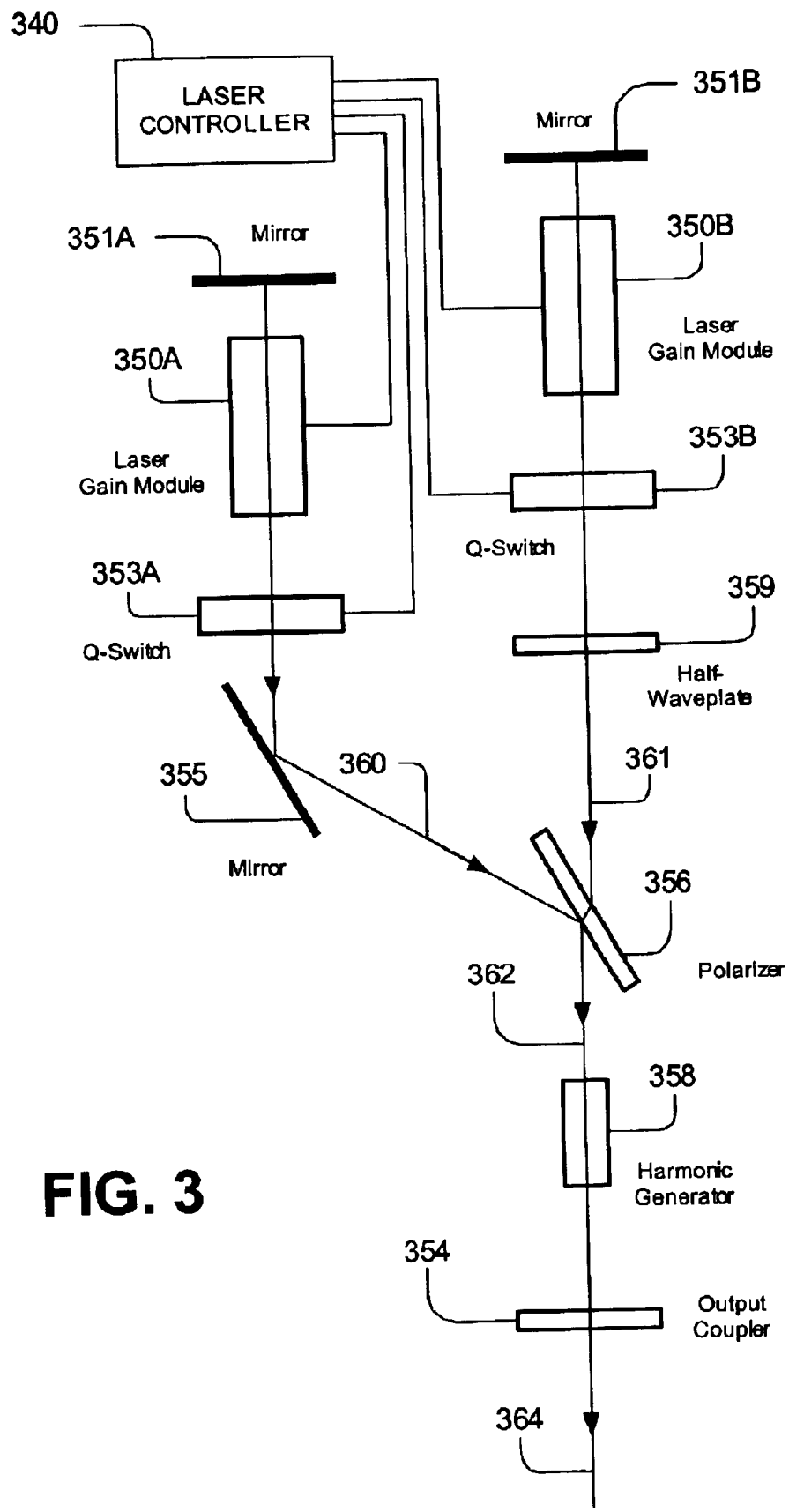
FIG. 3 shows a first embodiment of a laser system according to the present invention, using intra-cavity polarization coupling and an intracavity harmonic generator.
Figure 4:
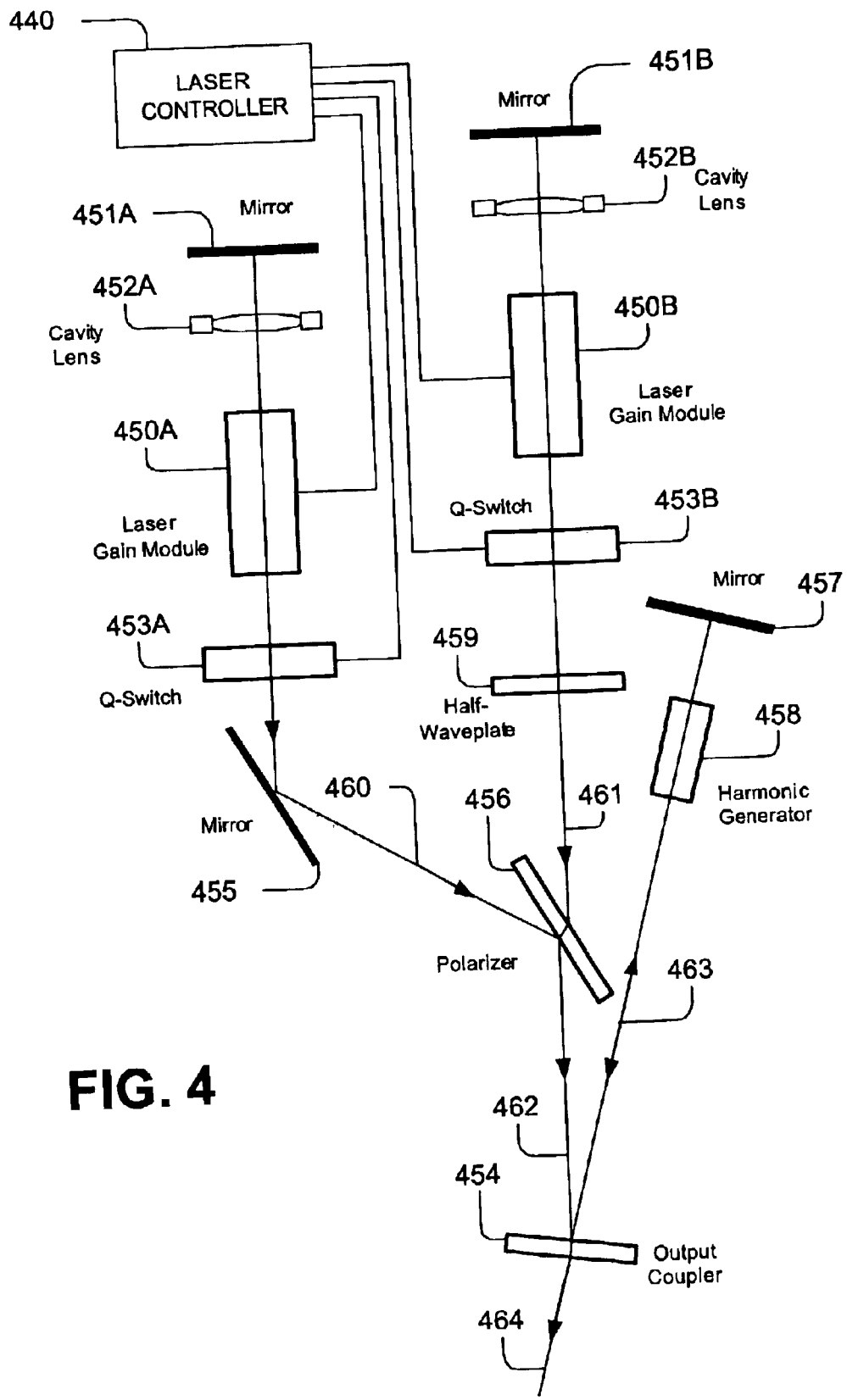
FIG. 4 shows a second embodiment of a laser system of the present invention.
Figure 5:
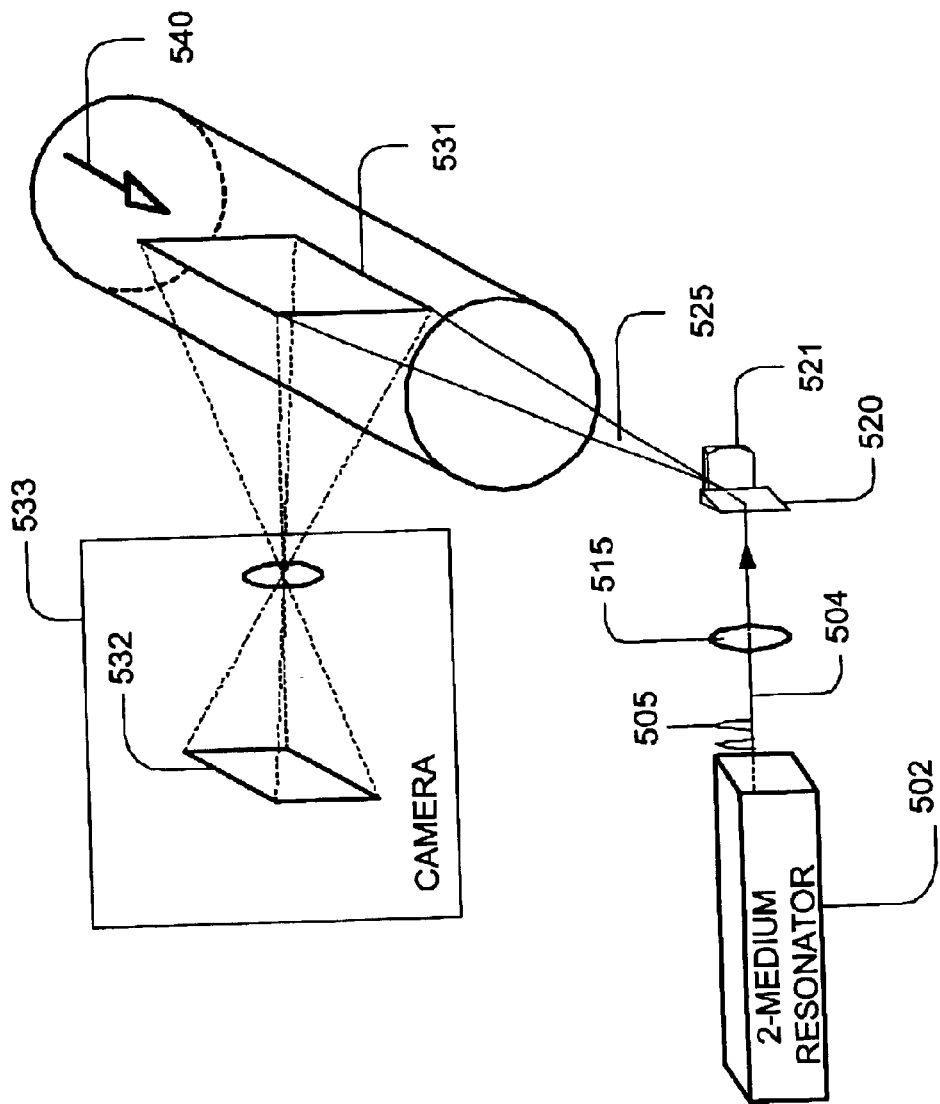
FIG. 5 shows a PIV system including a laser system according to the present invention.

A detailed description of embodiments of the present invention is provided with reference to FIGS. 3–5.

A laser system diagram according to the present invention is provided in FIG. 3. The laser system of FIG. 3, includes a branched resonator, having two gain media (350A and 350B) and a single output coupler 354. The branched resonator has an output leg 362, a first gain leg 360 and a second gain leg 361. A first set of optical components defines the output leg 362 within the resonator, including the output coupler 354, a harmonic generator 358 and a polarizer 356. A second set of optical components including first mirror 351A, a first laser gain module 350A, a first Q-switch 353A, and mirror 355, define the first gain leg 360. The first gain leg defines an optical path through the first laser gain module 350A, between the polarizer 356 and the first mirror 351A. The laser system includes a third set of optical components, including a first mirror 351A, a second laser gain module 350B, a second Q-switch 353B, and a half-wave plate 359, which define the second gain leg 361. The second gain leg 361 defines an optical path through the second laser gain module 350B, and between the polarizer 356 and the second mirror 351B. The first and second gain legs 361, 361 merge at the polarizer into the output leg 362, so that pulses generated in the first and second laser gain modules 350A, 350B are co-located in the output leg 362.

In the output leg 362, pulses from the first and second gain legs 360 and 361 pass through harmonic generator 358, which converts the wavelength of the pulses from a primary wavelength to a harmonic of the primary wavelength, in this example. For example, where the primary wavelength is 1064 nanometers, as generated in Nd-doped laser media, the harmonic generator converts the laser energy to a visible harmonic, such as the second harmonic at 532 nanometers. Other embodiments may deploy the harmonic generator outside the laser resonator.

The output coupler 354 where there is an intra-cavity harmonic generator as shown in FIG. 3, comprises a component that is highly reflective at the primary wavelength and at least partially transmissive at the harmonic wavelength, so that laser pulses at the harmonic wavelength are emitted from the laser system from the single output coupler 354. The pulses from the first and second laser gain modules are co-located along a single output beam path 364.

Laser controller 340 is coupled to the Q-switches 353A, 353B and to the first and second laser gain modules 350A, 350B in the first and second gain legs of the resonator. The laser controller 340 provides control signals to apply pump energy to gain media in the gain modules, and to operate the Q-switches to generate pairs of substantially identical pulses in rapid succession. In the embodiment described, two gain branches are shown for generating two pulses closely spaced in time, co-located on a single output beam path. Other embodiments may employ more than two branches for generation of more that two pulses.

A more detailed description of an embodiment of a laser system according to the present invention is shown in FIG. 4. This embodiment also comprises a branched laser resonator, having a first gain leg 460 and a second gain leg 461. The first gain leg 460 and second gain leg 461 merge into a folded output leg including segments 462 and 463, by employing intra-cavity polarization coupling. The optical components defining the branched laser resonator are mounted on a single plate, within a single protective box. This facilitates temperature control and management of mechanical vibrations for the two branches of the laser resonator. In addition, this allows for careful alignment of the components during manufacture for more precise co-location of output pulses.

The folded output leg is defined by optical components including polarizer 456, output coupler 454, harmonic generator 458 and high reflecting mirror 457. The first gain leg 460 is defined by optical components including high reflecting mirror 451A, cavity compensation lens 452A, laser gain module 450A, Q-switch 453A and turning mirror 455. The second gain leg 460 is defined by optical components including high reflecting mirror 451B, cavity compensation lens 452B, laser gain module 450B, Q-switch 453B and half-wave plate 459.

In the embodiment shown in FIG. 4, the high reflecting mirror 451A, high reflecting mirror 451B, output coupler 454 and high reflecting mirror 457 are essentially flat reflectors. Cavity compensation lenses 452A and 452B stabilize the resonant cavity. Other configurations of optical components can be used for defining the resonant cavity as known in the art.

Embodiments of the invention implement the laser gain modules 450A, 450B with gain media and pump sources that have substantially identical specifications. In one preferred embodiment, the gain medium comprises a solid-state medium that does not significantly affect polarization of light resonating through the medium. For example, the laser gain modules comprise diode-pumped, Nd:YLF. In other embodiments, Nd:YAG may be utilized as the gain medium, where the birefringence of the laser crystal is compensated for, or otherwise tolerated, in the system. Also, other pump sources are available for use with the laser gain modules, including arc lamps, flash lamps and the like.

The Q-switches 453A, 453B are implemented in one example using electro-optical Q-switching. Other embodiments may apply acousto-optical Q-switches. Furthermore, other means for causing pulse generation in the laser system may be utilized. To improve the uniformity of the pulses generated in the first and second gain legs, the Q-switches 453A, 453B are chosen so that they have substantially identical specifications.

The turning mirror 455 directs pulses in the first gain leg 460 to the polarizer 456. The polarizer 456 is arranged to reflect pulses polarized in a first polarization direction, onto the first segment 462 of the output leg in the branched resonator. The half-wave plate 459 in the second gain leg 461 rotates the polarization of beams on the second gain leg 461 by ninety degrees from the first polarization direction. The polarizer 456 is arranged to transmit pulses having rotated polarization from the second gain leg 461 onto the first segment 462 of the output leg in the branched resonator.

The output coupler 454 in this embodiment comprises an optical component that is highly reflective at the primary wavelength produced in the laser gain modules 450A, 450B, such as the wavelength 1064 nm generated using neodymium doped laser crystals. Thus, pulses at the primary wavelength are reflected from the first segment 462 of the output leg onto the second segment 463 of the output leg through the harmonic generator 458. High reflecting mirror 457 in this embodiment is highly reflective at both the primary and harmonic wavelengths. The output coupler 454 is at least partially transmissive at the second harmonic wavelength 532 nm, and allows pulses at the second harmonic wavelength from the second segment 463 of the output leg to be emitted from the laser resonator as output pulses on the output beam line 464.

The harmonic generator 458 in this embodiment is implemented using a Type II second harmonic generation crystal, such as LBO or KTP. Furthermore, it is preferably implemented using LBO, or another material that does not demonstrate significant birefringence which would significantly impact of polarization of the light at the primary wavelength. The Type II second harmonic generation crystal is aligned 45 degrees off axis of the polarization of the light at the primary wavelength from the first and second gain legs 460, 461.

The laser controller 440 is implemented in some embodiments using a programmable computer and supporting electronics. The laser controller 440 operates to cause the laser resonator to generate pulse pairs, where the pulses within a pair are separated by a time interval from about 1 microsecond to about 100 microseconds. Preferably, the time interval of separation of the pulses is adjustable over a range from close to zero (overlapping) to a millisecond or more, so that the operator can apply pulse separation suitable for a particular use. The repetition rate of the pulse pairs in one embodiment is adjustable from one-shot pulse pairs up to the limits of the Q-switching in the laser resonator. For example, the peak repetition rate for pulse pairs may be as much as 100 kHz, using commercially available acousto-optical Q-switches. In PIV embodiments, the repetition rate for pulse pairs is set to match the frame rate of the camera capturing the images, typically ranging from about 1 hertz to about 5 kHz, with an average output power for each gain module of 10 to 15 watts.

The pulse duration for pulses in the pulse pairs is preferably substantially equal, in a range from about 5 nanoseconds to about 200 nanoseconds in length, depending on the gain medium. The power of the individual pulses is about 10 milli-joules per pulse in one representative embodiment and can be adjusted, for example according to the sensitivity of the camera and other system parameters.

The laser controller 440 may include triggering gate electronics for the Q-switches, and pump sources, which can be calibrated to compensate for variations in the optical components, so that precise control over the timing and energy of the pulse pairs can be achieved.

FIG. 5 illustrates a PIV system, including laser composed of a 2-medium resonator 502 used to produce pulses in rapid succession, such as pulse pairs (schematically pulse pair 505). Pulses from the 2-medium resonator 502 are emitted in a single beam line on path 504 through spherical lens 515 to prism 520. Prism 520 directs the pulse pairs to cylindrical lens 521, or other beam expanding optics, which expands the pulse pairs into pulsed illumination sheet 525 in the fluid flow 540. In this embodiment, the lens 504, prism 520 and lens 521 are mounted on a separate plate than the laser resonator 502. In other embodiments, these components may be mounted with the resonator 502 during manufacture.

The pulsed illumination sheet 125 illuminates particles 531 within fluid flow 540, and the particles thus illuminated form a double exposure image 532 within camera 533, showing movement of the particles in the flow 540 between the pulses in the pulse pair 505. Particle images thus acquired, are processed by computer where a PIV analysis can be performed.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A laser system comprising:
a laser resonator, including a first laser gain module, a second laser gain module, and a shared output coupler, inducing pulses co-located in an output beam path, wherein the first laser gain module produces pulses at a primary wavelength and the second laser gain module produces pulses having a wavelength substantially equal to said primary wavelength; and
a controller coupled to the first and second laser gain modules, which induces a first pulse by the first laser gain module and a second pulse by the second laser gain module, wherein the first and second pulses which do not overlap in time and are spaced in time by a time interval of less than about 1 millisecond.

2. The laser system of claim 1, wherein the first and second laser gain modules have substantially equal specifications.

3. The laser system of claim 1, wherein said time interval is less than about 100 microseconds.

4. The laser system of claim 1, including first and second Q-switches coupled with the first and second laser gain modules, respectively.

5. The laser system of claim 1, wherein the first and second laser gain modules include respective solid state gain media.

6. The laser system of claim 1, including a polarizer positioned to merge pulses emitted from the first and second laser gain modules into a co-located beam paths, and a polarization rotator coupled with one of the first and second laser gain modules that rotates polarization by about 90 degrees.

7. The laser system of claim 1, including a harmonic generator, wherein the harmonic generator does not substantially affect polarization of beams.

8. The laser system of claim 1, including a harmonic generator in the output beam path, and the output coupler is highly reflective for the primary wavelength and at least partially transmissive for a harmonic of the primary wavelength.

9. The laser system of claim 1, wherein the first and second laser gain modules comprise Neodymium-doped laser crystals.

10. The laser system of claim 1, wherein the first and second laser gain modules comprise diode-pumped, Neodymium-doped laser crystals.

11. The laser system of claim 1, including a type II second harmonic generator inside the laser resonator, wherein the first and second laser gain modules comprise diode-pumped, Nd:YLF.

12. The laser system of claim 1, wherein the output pulses have pulse widths less than about 100 nanoseconds.

13. The laser system of claim 1, comprising a beam expander in the output path to distribute energy from said pulses in an illumination sheet, and an imaging system arranged to capture an image of particles flowing in said illumination sheet during the first and second pulses.

14. A laser system comprising:
a laser resonator adapted to produce laser pulses, the resonator having a resonant path including an output leg, a first gain leg and a second gain leg,
optical components, including an output coupler and a polarizer, defining the output leg,
optical components, including a first Q-switch, a first laser gain module and a first high reflector, defining the first gain leg from the polarizer through the first laser gain module to the first high reflector, the first laser gain module producing pulses at a primary wavelength, and
optical components, including a second Q-switch, a second laser gain module, a polarization rotator and a second high reflector, defining a second gain leg from the polarizer through the second laser gain module to the second high reflector, the second laser gain module producing pulses having a wavelength substantially equal to said primary wavelength,
beams in the first and second gain legs merging at the polarizer into the output leg; and
a controller coupled to the first and second laser gain modules and to the first and second Q-switches, which induces a first pulse of laser output by the first laser gain module, and a second pulse of laser output by the second laser gain module, which do not overlap in time and are emitted from the laser resonator by the output coupler co-located on an output beam path.

15. The laser system of claim 14, wherein the first and second pulses have pulse widths less than about 100 nanoseconds, and the controller causes the first and second pulses to be spaced in time by a time interval of less than about 1 millisecond.

16. The laser system of claim 14, wherein the output leg includes a harmonic generator, and the output coupler in the output leg comprises a component highly reflective for the primary wavelength, and least partially transmissive for a harmonic wavelength generated in the harmonic generator.

17. The laser system of claim 14, wherein the output leg includes a harmonic generator, and the output coupler in the output leg comprises a component highly reflective for the primary wavelength, and least partially transmissive for a harmonic wavelength generated in the harmonic generator, and wherein the output leg includes a high reflector for the harmonic wavelength generated in the harmonic generator;

the output coupler arranged to reflect light in the primary wavelength from the polarizer along a beam line through the harmonic generator to the high reflector, and to transmit light in the harmonic wavelength from the harmonic generator on the output beam path.

18. The laser system of claim 14, wherein the first and second laser gain modules and the first and second Q-switches in the first and second gain legs have substantially equal specifications.

19. The laser system of claim 14, including a harmonic generator in the output leg, and wherein the harmonic generator does not substantially affect polarization of beams.

20. The laser system of claim 14, wherein the first and second laser gain modules comprise gain media that do not substantially affect polarization of beams.

21. The laser system of claim 14, including a harmonic generator in the output leg, and wherein the harmonic generator comprises a type II second harmonic generator.

22. The laser system of claim 14, including a harmonic generator in the output leg, and wherein the harmonic generator comprises LBO.

23. The laser system of claim 14, wherein the first and second laser gain modules include media comprising Nd:YLF.

24. The laser system of claim 14, wherein the first and second Q-switches comprise electro-optical Q-switches.

25. The laser system of claim 14, wherein the output pulses comprise visible laser pulses.

26. The laser system of claim 14, comprising a beam expander in the output path to distribute energy from said pulses in an illumination sheet, and an imaging system arranged to capture an image of particles flowing in said illumination sheet during the first and second pulses.

27. A system for particle image velocimetry metorology, comprising:

a laser resonator, including a first laser gain module, a second laser gain module, and a shared output coupler, inducing pulses co-located in an output beam path, wherein the first laser gain module produces pulses at a primary wavelength and the second laser gain module produces pulses having a wavelength substantially equal to said primary wavelength;

a controller coupled to the first and second laser gain modules, which induces a first pulse by the first laser gain module and a second pulse by the second laser gain module, wherein the first and second pulses do not overlap in time and are spaced in time by a time interval of less than about 100 microseconds; and optics arranged in the output beam path to expand the pulses to form a pulsed illumination sheet; and a camera to capture images of the pulsed illumination sheet.

28. The system of claim 27, wherein the resonator has a resonant path including an output leg, a first gain leg and a second gain leg, the resonator comprising optical components, including an output coupler, a type II harmonic generator and a polarizer, defining the output leg, optical components, including a first electro-optical Q-switch, a first Nd:YLF laser gain module and a first high reflector, defining the first gain leg from the polarizer through the first laser gain module to the first high reflector, and optical components, including a second electro-optical Q-switch, a second Nd:YLF laser gain module, a polarization rotator and a second high reflector, defining a second gain leg from the polarizer through the second laser gain module to the second high reflector, beams in the first and second gain legs merging at the polarizer into the output leg.

29. The system of claim 28, wherein the output coupler in the output leg comprises a component highly reflective for the primary wavelength, and least partially transmissive for a harmonic wavelength generated in the harmonic generator, and wherein the output leg includes a high reflector for the harmonic wavelength generated in the harmonic generator;

the output coupler arranged to reflect light in the primary wavelength from the polarizer along a beam line through the harmonic generator to the high reflector, and to transmit light in the harmonic wavelength from the harmonic generator on the output beam path.

* * * * *